US010589856B2

(12) United States Patent
Hohenthal

(10) Patent No.: US 10,589,856 B2
(45) Date of Patent: Mar. 17, 2020

(54) AIRCRAFT

(71) Applicant: Markus Hohenthal, Espoo (FI)

(72) Inventor: Markus Hohenthal, Espoo (FI)

(73) Assignee: Lentola Logistics Oy, Espoo (FI)

( * ) Notice: Subject to any disclaimer, the term of this patent is extended or adjusted under 35 U.S.C. 154(b) by 329 days.

(21) Appl. No.: 15/520,260

(22) PCT Filed: Oct. 20, 2015

(86) PCT No.: PCT/FI2015/050710
§ 371 (c)(1),
(2) Date: Apr. 19, 2017

(87) PCT Pub. No.: WO2016/062921
PCT Pub. Date: Apr. 28, 2016

(65) Prior Publication Data
US 2017/0320568 A1    Nov. 9, 2017

(30) Foreign Application Priority Data

Oct. 21, 2014    (FI) .................................... 20140285

(51) Int. Cl.
*B64C 15/12*    (2006.01)
*B64C 29/02*    (2006.01)
(Continued)

(52) U.S. Cl.
CPC ............ *B64C 29/02* (2013.01); *B64C 39/024* (2013.01); *B64D 27/24* (2013.01); *B64C 15/12* (2013.01);
(Continued)

(58) Field of Classification Search
CPC ................................ B64C 15/12; B64C 27/28
(Continued)

(56) References Cited

U.S. PATENT DOCUMENTS 3,035,789 A * 5/1962 Young ................. B64C 29/0033
244/7 C
3,666,209 A * 5/1972 Taylor ................. B64C 29/0033
244/12.4
(Continued)

FOREIGN PATENT DOCUMENTS

CN        102627147 A    8/2012
CN        103287576 A    9/2013
(Continued)

OTHER PUBLICATIONS

European search report of EP15851788.8 issued by European Patent Office dated May 16, 2018.
(Continued)

*Primary Examiner* — Stephen Johnson
(74) *Attorney, Agent, or Firm* — Berggren LLP

(57) ABSTRACT

An electrically powered vertical takeoff and vertical landing (VTOL) aircraft, which comprises at least two main propellers, wherein the main propellers are adapted to generate at least 70% of the aircraft propulsion. The aircraft also comprises at least one adjustment propeller, which has its propeller slipstream adapted to produce a torque relative to a first axis or the first and second axes with respect to a fuselage of the aircraft for turning the aircraft relative to said first axis or said first and second axes. In addition, not less than 35%, but not more than 85%, of the aircraft's mass is adapted to lie, during takeoff and/or landing, on a rear side of a propeller line of said main propellers with respect to a nose of the aircraft.

15 Claims, 2 Drawing Sheets

(51) Int. Cl.
*B64C 39/02* (2006.01)
*B64D 27/24* (2006.01)

(52) U.S. Cl.
CPC .. *B64C 2201/028* (2013.01); *B64C 2201/042* (2013.01); *B64C 2201/088* (2013.01); *B64C 2201/104* (2013.01); *Y02T 50/62* (2013.01)

(58) Field of Classification Search
USPC ........................................................ 244/12.4
See application file for complete search history.

(56) References Cited

U.S. PATENT DOCUMENTS

| | | | |
|---|---|---|---|
| 7,861,967 B2* | 1/2011 | Karem | B64C 3/10 244/12.4 |
| 8,308,522 B2* | 11/2012 | Van de Rostyne | A63H 27/06 244/17.23 |
| 2002/0003188 A1 | 1/2002 | Moshier | |

FOREIGN PATENT DOCUMENTS

| | | | |
|---|---|---|---|
| EP | 1759988 A2 * | 3/2007 | ............ B64C 15/00 |
| GB | 2419122 A | 4/2006 | |
| WO | 9411246 A2 | 5/1994 | |
| WO | 2006069291 A2 | 6/2006 | |
| WO | 2008054234 A1 | 5/2008 | |
| WO | 2008140851 A2 | 11/2008 | |
| WO | 2009066073 A1 | 5/2009 | |
| WO | 2012035153 A1 | 3/2012 | |

OTHER PUBLICATIONS

Finnish Patent and Registration Office, Search Report issued in FI20140285, dated May 20, 2015.

Moore, M., "NASA Putting Electric Tailsitter VIOL Concept". Conference Paper; 10th AIAA Aviation Technology, Integration and Operations (ATIO) Conference; Sep. 13-15, 2010; Forth Worth, Texas, USA. Published 2010-0-13. [Retrieved May 19, 2015] from Internet address http://ntsr.nasa.gov/archive/nasa/casi.ntrs.nasa.gov/20110011311.pdf, pp. 1-12.

* cited by examiner

AIRCRAFT

The invention relates to an electrically powered vertical take-off and landing aircraft.

PRIOR ART

Prior known are a variety of VTOL flying machines, such as for example helicopters, but also smallish aircraft to be lifted in the air with propellers. Of particular interest are such aircraft which are lifted in the air with propellers and which take off and land vertically but are in a substantially horizontal position while cruising.

One problem with this type of aircraft is nevertheless for example how to turn them after takeoff from a vertical position to a horizontal flight position and, respectively, from a horizontal flight position to a vertical position for landing. Although, at least in principle, such aircraft are capable of operating (takeoffs and landings) on patches of quite a small area, in practice they drag over quite a long distance before the airspeed is high enough to provide the control surfaces (e.g. the elevator) with a steering force sufficient for turning the machine for example to a cruising position. Likewise, the landing also requires in practice an area which is quite large with respect to a theoretically envisaged landing area, since the turning of such aircraft in a stationary condition for example around its longitudinal axis is difficult or even impossible in a controlled manner.

SUMMARY

It is one objective of the invention to eliminate or at least to alleviate drawbacks involved in the prior art. According to one embodiment, the invention pursues to introduce such an aircraft which is capable of performing the takeoff and landing in a vertical plane and the actual cruising in a substantially horizontal plane, and wherein switching of the aircraft between these two flight modes is achieved quickly, over a small area or distance, without major forces for aerodynamic control surfaces (control surfaces which require quite a high airspeed to be functional), as well as without a significant airspeed.

Some of the objectives of the invention will be attained with an aircraft of claim 1.

The aircraft of the invention is characterized by what is presented in claim 1 directed to an aircraft.

In the invention, according to a first embodiment, the aircraft is an electrically powered vertical takeoff and vertical landing (VTOL) aircraft, wherein the aircraft comprises at least two main propellers which are adapted to generate at least 70% of aircraft propulsion. The aircraft comprises preferably at least one adjustment propeller, having its propeller slipstream adapted to produce a torque with respect to a first axis or first and second axes relative to the aircraft fuselage. Said first axis is preferably perpendicular to the aircraft's longitudinal axis and said second axis is preferably perpendicular to the aircraft's vertical axis. According to one embodiment, the propeller slipstream can also be adapted to produce a torque relative to a third axis of the aircraft, which is preferably perpendicular to said first and second axes.

According to one example, upon producing a torque relative to said first axis, the nose of an aircraft strives to turn in an up/down direction while the aircraft is in level flight. According to one example, upon producing a torque relative to said second axis, the nose of an aircraft strives to turn in lateral direction (left or right) while the aircraft is in level flight. According to one example, upon producing a torque relative to said third axis, the aircraft strives to tilt with respect to its longitudinal axis either to the left or right while the nose retrains its orientation essentially unchanged.

According to one embodiment, regarding the mass of an aircraft (most preferably in a flight ready condition and loaded), not less than 35%, but not more than 85%, is adapted to lie, at least during takeoff and/or landing, on a rear side of the propeller line of said main propellers with respect to the aircraft nose. According to one embodiment, regarding the mass of an aircraft, not less than 40%, more preferably not less than 45%, more preferably not less than 50% or more preferably not less than 55%, but not more than 75% or more preferably not more than 65%, is adapted to lie, at least during takeoff and/or landing, on a rear side of the propeller line of said main propellers with respect to the aircraft nose.

The center of gravity of an aircraft can naturally be controlled in various ways. According to one embodiment of the invention, regarding the mass of a battery pack that generates the electric power for aircraft propellers, not less than 75%, more preferably 90%, and most preferably the entire battery pack is disposed on a forward side of the propeller line of said main propellers with respect to the aircraft's nose.

According to one embodiment, the mass that an aircraft comprises can be manipulated in such a way that not less than 35%, but not more than 85%, of the aircraft's mass is located, at least during takeoff and/or landing, on a rear side of the propeller line of said main propellers with respect to the aircraft's nose. According to one embodiment, the mass can be manipulated in such a way that not less than 40%, more preferably not less than 45%, more preferably not less than 50% or more preferably not less than 55%, but not more than 75% or more preferably not more than 65%, of the aircraft's mass lies, at least during takeoff and/or landing, on a rear side of the propeller line of said main propellers with respect to the aircraft's nose. It should be noted that, during level flight, the mass distribution can be other than during takeoff and/or landing and thereby more preferred in terms of cruising.

According to one embodiment, said battery pack or at least a portion thereof is adapted to be movable and thereby capable of shifting the aircraft's center of gravity between various flight modes. This can be realized in a variety of ways. For example, the discussed mass (e.g. the battery pack or at least a portion thereof) can be mounted on tracks and the distance of the mass from a given point can be changed with a shifting mechanism integrated with the mass, such as for example with a threaded rod, a chain, cylinders or cables or other solutions apt for manipulation. It should be noted that the mass if shifted in the direction of at least one axis, most preferably along the longitudinal axis (from aft to nose and vice versa), yet it is also possible that the mass can be shifted in the direction of some other axis.

By means of these embodiments, the center of gravity of an aircraft can be placed very close to the line of the main propellers, whereby the aircraft is capable of being turned from a takeoff and/or landing position (vertical position) to a cruising position (substantially level flight position) with very small deflection forces, as well as very quickly. Thus, likewise the area, space or distance demanded by an aircraft, within or over which the aircraft is capable of being switched from a flight mode or position to another, is very small or short, thus providing a considerable advantage over the prior known solutions.

Indeed, the aircraft according to the invention can be used for operations from genuinely very small areas, for example from an area encircled by surrounding obstacles, such as trees, which are highly typical locations for example in rescue operations for which the aircraft of the invention is highly useful. In addition, the aircraft of the invention has its operating principle speeding up the passage of an aircraft from one place to another as measured from takeoff to landing, because switching the aircraft from a takeoff position to a level flight position can be achieved even at very low airspeeds, nor is it therefore necessary to raise the aircraft to a very high altitude. The same principle applies also in the transition from level flight to a landing position. It is by virtue of the weight distribution in an aircraft of the invention and, according to one embodiment, the shifting of the center of gravity that quite a modest torque will be sufficient for turning or ""tipping" the aircraft from vertical position to horizontal position and vice versa.

The torque generated by the propeller slipstream of the aircraft's adjustment propeller can be achieved in various ways. According to one embodiment, the propeller slipstream produced by the adjustment propeller is adapted to be deflectable relative to any axis of the aircraft with respect to the fuselage and thereby to produce said torque. According to one embodiment, the relative propulsion of at least two adjustment propellers of the aircraft, and hence the torque produced thereby, is adapted to be adjustable. This can be achieved for example by changing the geometric pitch angles or by changing the rotational speed of the propellers. Further, according to one embodiment, the shaft of at least one adjustment propeller is adapted to be pivotable and the adjustment propeller is thereby adapted to produce said torque.

The aircraft comprises preferably at least one electric motor, which is connected by way of at least one axle and/or link to an adjustment propeller for rotating the same. According to one embodiment, the adjustment propeller is pivotable relative to the electric motor and further the at least one axle with respect to the aircraft fuselage and is thereby capable of producing said torque. According to one example, the at least one link is substantially flush with a leading edge of the aircraft wing, whereby the propeller need not be disposed even partially inside the wing, which would result both structurally and aerodynamically a more challenging situation. It is obvious, however, that according to one example the propeller can also be disposed at least partially inside the wing, but more preferably its location is nevertheless outside the wing, for example in front of the wing's leading edge.

According to one embodiment, the electric motor is connected by way of at least one axle to an adjustment propeller for rotating the same, such that the adjustment propeller and the electric motor are pivotable as a single assembly relative to the aircraft's fuselage.

According to one embodiment, the adjustment propeller, which has a propeller slipstream produced thereby adapted to generate said torque relative to any axis of the aircraft, is at least one of said main propellers. Alternatively, or in addition to this, said adjustment propeller can also be an auxiliary propeller provided in addition to said main propellers. The auxiliary propeller can be positioned for example relative to the main propellers in such a location which enables it to produce, with quite a modest force, a sufficient torque for turning the aircraft relative to one of its axes. For example, the auxiliary propeller can be located in the fuselage towards a tail end of the craft, whereby the fuselage preferably constitutes a lever arm, or the auxiliary propeller can be located at a tip of the wing, whereby the wing spar line preferably constitutes a lever arm.

According to one example, the aircraft comprises two or more main or auxiliary propellers. In addition, the aircraft may comprise at least two propeller blades, which are adapted to be rotatable in directions opposite to each other and which balance a total torque of the craft. It should be noted that the propellers can be coplanar or non-planar relative to each other.

The aircraft comprises preferably also a passenger and/or cargo compartment. According to one embodiment, the passenger and/or cargo compartment is disposed in such a way that, especially during cruising with the aircraft in level flight, the passengers are in a substantially lying position either on the stomach, on the side or on the back. According to one embodiment, the passenger and/or cargo compartment is disposed in such a way that the passengers and/or the cargo remain substantially in the same position throughout the entire flight, i.e. during takeoff, cruising and landing. The position can be any position considered favorable in a particular situation, such as for example a lying position in relation to the Earth's surface or gravitational field or with respect to acceleration.

According to one embodiment, the aircraft comprises two sections adapted to be pivotable relative to each other, the first one of which comprises at least said main propellers adapted to generate not less than 70% of the aircraft propulsion, and the second one of which may comprise a passenger and/or cargo compartment. Said first and second sections can be adapted to be pivotable for example to a first position for the duration of a landing and/or a takeoff and to a second position for the duration of a flight for example in such a way that the passengers and/or the cargo retain substantially the same position throughout the entire flight.

Still further, the aircraft of the invention may comprise at least one elevator, rudder, horizontal stabilizer and/or vertical stabilizer, but it should be appreciated that the aircraft of the invention is capable of operating even without these, since for example the necessary control forces can be achieved with said torques. In addition, the aircraft of the invention may comprise numerous other solutions known as such in aircraft to facilitate its operation or to improve safety, such as for example navigation equipment, an autopilot for performing at least some of the aircraft's functions automatically, as well as for example a rescue parachute which is most preferably adapted to bring the aircraft on the ground in a controlled manner in a possible state of emergency such that the aircraft, the cargo carried thereby or the passengers remain with high probability essentially unharmed.

According to one embodiment, the aircraft comprises a horizontal and/or vertical stabilizer, which is or both of which are adapted to extend along the aircraft fuselage in such a way that at least a portion of the horizontal and/or vertical stabilizer's interior is designed as a passenger and/or cargo compartment of the aircraft fuselage.

The invention offers clear-cut advantages over the prior art as pointed out earlier in this disclosure. For example, turning of the aircraft from a takeoff position to a cruising position can be executed even at very low airspeeds and, by virtue of the aircraft's weight distribution, it is quite a modest torque which is sufficient for turning or "tipping" the aircraft from a vertical position to level flight and vice versa. Therefore, for example the aerodynamics of the possible tail structures of aircraft is almost meaningless e.g. in a turning process of the aircraft.

In addition, the described distribution of mass, and particularly the accommodation of a battery pack either entirely or at least for the large part ahead of the propeller line, allows for a highly straightforward, effective and rapid turning of the aircraft from a vertical position to level flight. The controllably steerable and adjustable torque of propeller slipstreams allows also for agile maneuvering of the aircraft in climbing and especially landing phases. The location of the center of gravity, as presented in this document, creates a moment that balances the moment present behind the propeller line with respect to a fulcrum which is substantially flush with the propeller line. The meaning of this leverage is considerable, since by placing the center of gravity as presented in this document, the aircraft center of gravity is established very close to the propeller line. With a sufficiently heavy battery pack (or other massive components in turn prolongs the operating time and range, as well as expedites maneuvering as compared for example to other electrically powered VTOL aircraft.

DESCRIPTION OF THE FIGURES

In the next section, preferred embodiments of the invention will be described in slightly more detail with reference to the accompanying figures, in which.

DETAILED DESCRIPTION OF THE FIGURES

Figure 1:
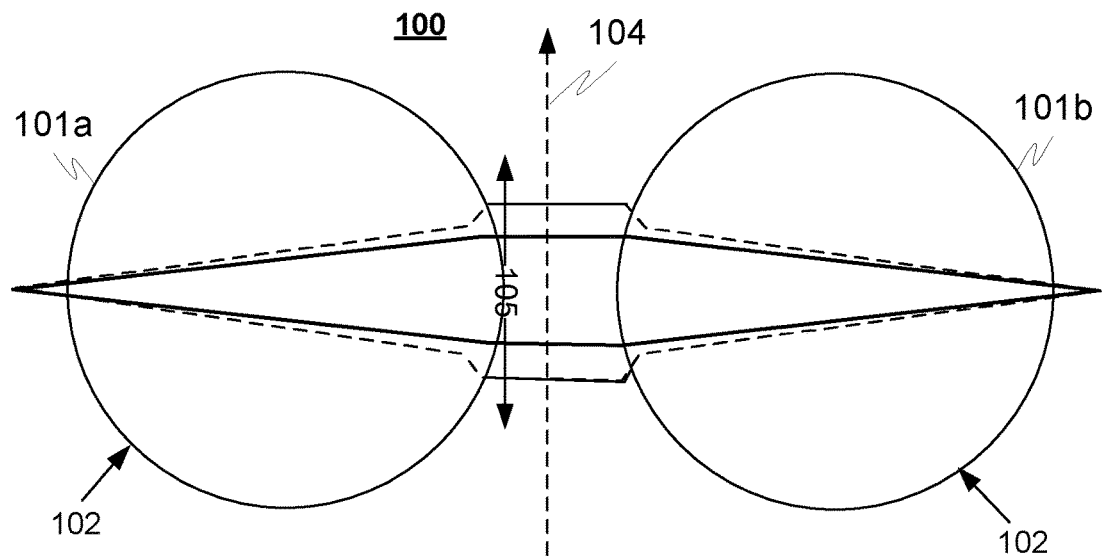
FIG. 1 shows one exemplary aircraft in a front view according to one preferred embodiment of the invention.
Figure 2:
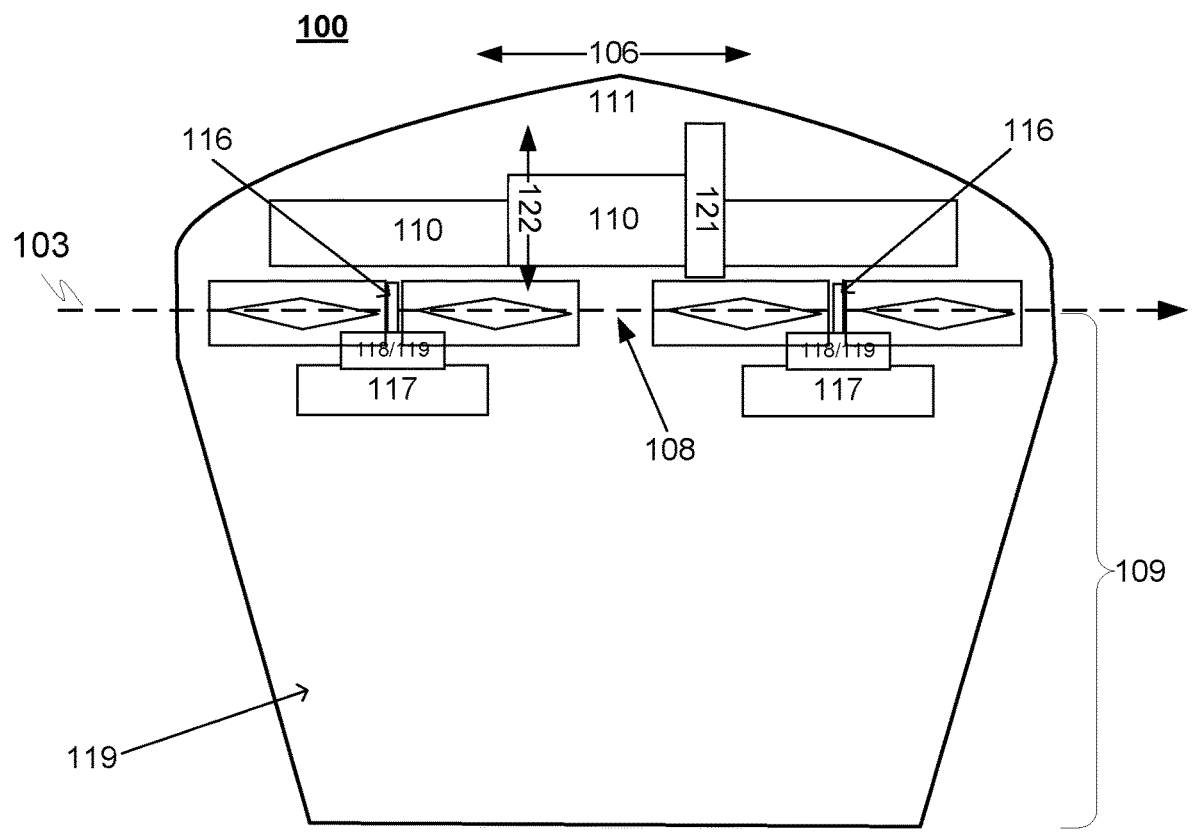
FIG. 2 shows one exemplary aircraft in a top view according to one preferred embodiment of the invention.

FIGS. 1-4 depict an exemplary aircraft 100 from various perspectives according to one preferred embodiment of the invention, wherein the aircraft is an electrically powered vertical takeoff and vertical landing (VTOL) aircraft. The aircraft comprises at least two main propellers 101a, 101b, as well as at least one adjustment propeller 102 which may be one of the main propellers 101a, 101b or a separate propeller 102 in addition to the main propellers 101a, 101b.

The adjustment propeller is arranged in such a way that its propeller slipstream produces a torque relative to a first axis 103 or the first 103 and a second axis 104 with respect to the aircraft fuselage. According to one example, when a torque is produced relative to said first axis 103, the aircraft's nose strives to turn in an up/down direction 105 when the aircraft is in level flight. According to one example, when torque is produced relative to said second axis 104, the aircraft's nose strives to turn in a lateral direction 106 (left or right) when the aircraft is in level flight. According to one example, when a torque is produced relative to said third axis, the aircraft strives to tilt 107 relative to its longitudinal axis either to the left or to the right with the nose retaining its orientation essentially unchanged.

According to one embodiment, regarding the aircraft's mass (most preferably in flight-ready condition and loaded), not less than 35%, but not more than 85%, is adapted to lie, at least during takeoff and landing, on a rearward side 109 of a propeller line 108 of said main propellers 101a, 101b with respect to the aircraft's nose. According to one embodiment, regarding the aircraft's mass, not less than 40%, more preferably not less than 45%, more preferably not less than 50%, or more preferably not less than 55%, but not more than 75% or more preferably not more than 65% is adapted to lie, at least during takeoff and landing, on the rearward side 109 of the propeller line 108 of said main propellers 101a, 101b with respect to the aircraft's nose.

According to one embodiment of the invention, regarding the mass of a battery pack 110 generating the electric power for the aircraft's propellers, not less than 75%, more preferably 90% and most preferably an entire battery pack 100, is disposed on a forward side of the propeller line 108 of the main propeller 101 with respect to the aircraft's nose 111. According to one embodiment of the invention, the battery pack 110, or at least a portion thereof, is adapted to be manipulated 121 in a direction 122 of at least one axis for shifting the center of gravity, as presented elsewhere in this document. It should be noted that, although this figure only shows the manipulation of a battery pack or a portion thereof, it is well applicable to the manipulation of some other mass, as well.

Figure 3:
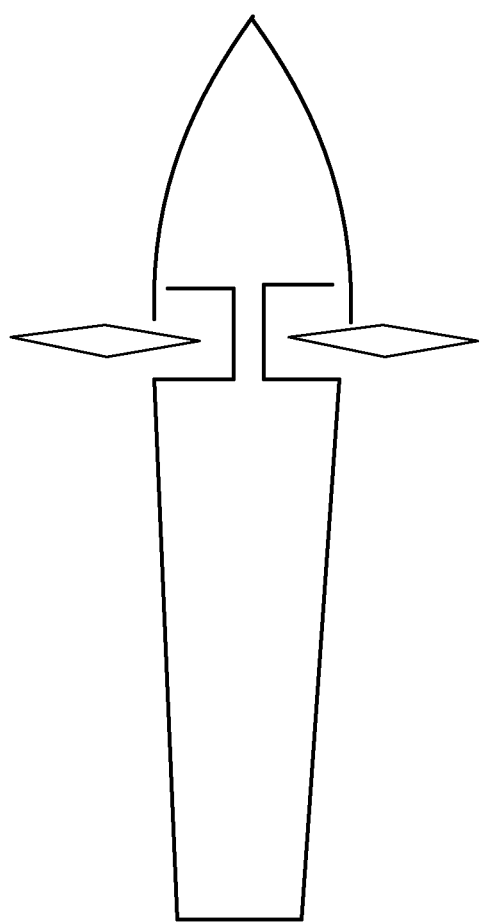
FIG. 3 shows one exemplary aircraft in a side view during takeoff and landing of the aircraft according to one preferred embodiment of the invention.
Figure 4:
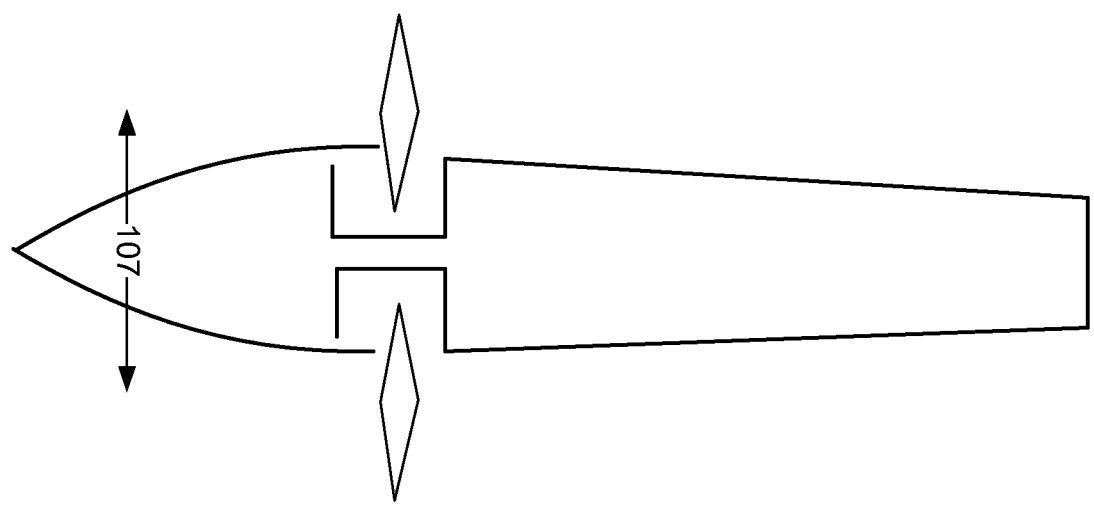
FIG. 4 shows one exemplary aircraft in a side view during cruising or level flight of the aircraft according to one preferred embodiment of the invention.

By virtue of the aircraft weight distribution of the invention, it is quite a modest torque which is sufficient for turning or "tipping" the aircraft from a vertical position to level flight and vice versa, i.e. from a takeoff stage shown in FIG. 3 to a cruising position shown in FIG. 4. Hence, the flight position shown in FIG. 4 is essentially both the takeoff position and the landing position.

According to one embodiment, the propeller slipstream produced by an adjustment propeller is adapted to be deflectable relative to some axis of the aircraft relative to a fuselage 119, and thereby adapted to produce said torque. According to one embodiment, a relative propulsion of at least two adjustment propellers of the aircraft, and hence the torque produced thereby, is adapted to be adjustable for example in such a way that the propulsion produced by a first adjustment propeller 101a is greater than the propulsion produced by a second adjustment propeller 101b. Further, according to one embodiment, at least one adjustment propeller has its shaft 116 adapted to be pivotable, the adjustment propeller being thereby adapted to produce said torque.

The aircraft comprises preferably at least one electric motor 117, which is connected to the adjustment propeller by way of at least one axle 118 and/or link 119 for rotating the same. According to one embodiment, the adjustment propeller 101a, 101b is pivotable relative to the electric motor 117 and further relative to at least one axle 116, 118 with respect to the fuselage 119 of the aircraft 100 and thereby adapted to produce said torque.

As stated above, the adjustment propeller 102 can be at least one of said main propellers 101a, 101b, or alternatively or in addition to this, said adjustment propeller 102 can also be an auxiliary propeller 102, which is arranged in addition to said main propellers 101a, 101b and which can be located for example on the fuselage 119 at a tail end of the craft or for example at a tip of the wing.

The aircraft also comprises preferably a passenger and/or cargo compartment 120.

Presented above are but a few embodiments for a solution of the invention. The principle according to the invention can naturally be modified within the scope of protection defined by the claims in terms of implementation details as well as fields of use. It is particularly noteworthy that the torque produced relative to any of the aircraft's axes can be established in a variety of ways, as presented elsewhere in this document. It should further be noted that the aircraft may well involve the use of one or several of the practices described in this document for producing a torque, and that the number of propellers can be two or more, these can be located in different planes, and that there can be an electric motor or electric motors common to several different propellers or, optionally, each propeller can be provided with its own controllable electric motor.

The invention claimed is:

1. An electrically powered vertical takeoff and landing (VTOL) aircraft, comprising at least two main propellers adapted to produce at least 70% of propulsion of the aircraft, wherein at least one of the at least two main propellers is a pivotable adjustment propeller having a propeller slipstream adapted to produce a torque relative to a first axis or the first and a second axes with respect to a fuselage of the aircraft for turning the fuselage of the aircraft relative to said first axis or said first and the second axes from a takeoff and landing positions in a vertical plane to a cruising position in a horizontal plane and vice versa, and wherein not less than 35%, but not more than 85% of a mass of the aircraft during a takeoff or a landing is on a rear side of a propeller line of said main propellers with respect to a nose of the aircraft.

2. The aircraft according to claim 1, wherein not less than 50%, but not more than 75% of the mass of the aircraft during the takeoff or the landing is on the rear side of the propeller line of said main propellers with respect to the nose of the aircraft.

3. The aircraft according to claim 2, wherein, not less than 55%, but not more than 65% of the mass of the aircraft is during takeoff or landing, on the rear side of the propeller line of said main propellers with respect to the aircraft's nose.

4. The aircraft according to claim 1, wherein the aircraft has a movable battery pack generating electric power for the propellers and being configured to shift a center of gravity of the aircraft between the takeoff or landing position in a vertical plane and a cruising position in a horizontal plane by moving along the first or the first and the second axis, and the movable battery pack has a mass of which not less than 75%, is disposed on a forward side of the propeller line of the main propellers.

5. The aircraft according to claim 4, wherein the aircraft comprises a horizontal or vertical stabilizer, and wherein the horizontal or vertical stabilizer is the battery pack or a portion of the battery pack and the horizontal or vertical stabilizer is adapted to extend along the aircraft's fuselage in such a way that at least a portion of an interior of the horizontal or vertical stabilizer is accommodated as a passenger or cargo compartment in the aircraft's fuselage.

6. The aircraft according to claim 5, wherein the battery pack is a part of a metal component which is adapted to be movable in a direction of at least one axis for shifting the center of gravity of the aircraft.

7. The aircraft according to claim 4, wherein the battery pack is disposed on a forward side of the propeller line of the main propellers.

8. The aircraft according to claim 1, wherein the propeller slipstream produced by the adjustment propeller is adapted to be deflectable relative to the first axis or the first and the second axes with respect to the aircraft's fuselage and thereby adapted to produce said torque.

9. The aircraft according to claim 1, wherein at least two of the at least two main propellers are pivotable adjustment propellers and a relative propulsion of the at least two adjustment propellers, and the torque are adapted to be adjustable.

10. The aircraft according to claim 1, wherein the aircraft comprises an electric motor, which is connected by way of at least one axle or link to the adjustment propeller for rotating the adjustment propeller.

11. The aircraft according to claim 10, wherein the adjustment propeller is pivotable relative to the electric motor and further relative to the first axis or the first and second axes with respect to the aircraft's fuselage.

12. The aircraft according to claim 10, wherein the adjustment propeller and the electric motor are pivotable as a single assembly relative to the aircraft's fuselage.

13. The aircraft according to claim 1, wherein said first axis is perpendicular to aircraft's longitudinal axis, and wherein said second axis is perpendicular to aircraft's vertical axis.

14. The aircraft according to claim 1, wherein at least two of the propellers rotate in directions opposite to each other.

15. The aircraft according to claim 1, wherein the aircraft comprises a passenger compartment.

* * * * *